US008684459B2

(12) United States Patent
Teufel et al.

(10) Patent No.: US 8,684,459 B2
(45) Date of Patent: Apr. 1, 2014

(54) VEHICLE SEAT, ESPECIALLY UTILITY VEHICLE SEAT

(75) Inventors: Ingo Teufel, Rockenhausen (DE); Kai Schumann, Reischweiler (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 106 days.

(21) Appl. No.: 13/256,509

(22) PCT Filed: Aug. 2, 2010

(86) PCT No.: PCT/EP2010/004718
§ 371 (c)(1), (2), (4) Date: Sep. 14, 2011

(87) PCT Pub. No.: WO2011/026546
PCT Pub. Date: Mar. 10, 2011

(65) Prior Publication Data

US 2012/0001467 A1 Jan. 5, 2012

(30) Foreign Application Priority Data

Sep. 1, 2009 (DE) ........................ 10 2009 040 461

(51) Int. Cl.
*A47C 3/00* (2006.01)

(52) U.S. Cl.
USPC ................................ 297/284.11; 297/344.12

(58) Field of Classification Search
USPC ....................................... 297/284.11, 344.12
See application file for complete search history.

(56) References Cited

U.S. PATENT DOCUMENTS

| | | | | |
|---|---|---|---|---|
| 1,324,013 | A * | 12/1919 | Sombra | 297/19 |
| 5,358,305 | A * | 10/1994 | Kaneko et al. | 296/65.02 |
| 6,386,633 | B1 * | 5/2002 | Newton | 297/284.1 |
| 7,669,929 | B2 * | 3/2010 | Simon et al. | 297/284.11 |
| 7,874,621 | B2 * | 1/2011 | Gumbrich et al. | 297/337 |
| 7,909,401 | B2 * | 3/2011 | Hofmann et al. | 297/284.11 |
| 7,938,488 | B2 * | 5/2011 | Thiel et al. | 297/312 |
| 7,997,648 | B2 * | 8/2011 | Becker et al. | 297/284.11 |

FOREIGN PATENT DOCUMENTS

| | | | |
|---|---|---|---|
| DE | 35 17 505 | C2 | 3/1987 |
| DE | 198 33 400 | C1 | 11/1999 |
| DE | 20 2006 001969 | U1 | 6/2007 |
| DE | 10 2008 046000 | A1 | 6/2009 |
| DE | 10 2008 049923 | A1 | 8/2009 |
| WO | 00/09358 | A1 | 2/2000 |

* cited by examiner

*Primary Examiner* — Sarah B McPartlin
(74) *Attorney, Agent, or Firm* — McGlew and Tuttle, P.C.

(57) ABSTRACT

A vehicle seat, especially a utility vehicle seat, includes a seat frame (16) and a seat shell (22) which is mounted so as to be displaceable relative to the seat frame (16) in the longitudinal direction of the seat (x) to adjust the seat depth. The seat depth can be adjusted by means of a motor (25) which is mounted on the seat shell (22).

16 Claims, 3 Drawing Sheets

20
25
8
22
17
16
7
1
3
12
10
5
15
8
z
x 24
29
25
26
26
z
y
x

VEHICLE SEAT, ESPECIALLY UTILITY VEHICLE SEAT

CROSS REFERENCE TO RELATED APPLICATIONS

This application is a United States National Phase application of International Application PCT/EP2010/004718 and claims the benefit of priority under 35 U.S.C. §119 of German Patent Application DE 10 2009 040 461.9 filed Sep. 1, 2009, the entire contents of which are incorporated herein by reference.

FIELD OF THE INVENTION

The invention relates to a vehicle seat, especially a utility vehicle seat, includes a seat frame and a seat shell which is mounted so as to be displaceable relative to the seat frame in a longitudinal direction of the seat in order to adjust the seat depth.

BACKGROUND OF THE INVENTION

In a vehicle seat of this type known from use, the seat depth may be adjusted manually. On the underside of the seat shell, a flexible locking bar is fastened, extending in the longitudinal direction of the seat, and which at its free front end has a handle. The locking bar—consisting for example of spring steel sheet—cooperates with a pin as a counter-gear, which is fastened to the front end of the seat frame and protrudes upwards. If the handle is pulled upwards, the locking bar is released from the pin and bears against the seat shell so that the seat cushion may be displaced as a whole in the longitudinal direction of the seat.

SUMMARY OF THE INVENTION

An object of the invention is to improve a vehicle seat of the aforementioned type. According to the invention, a vehicle seat especially a utility vehicle seat comprises a seat frame and a seat shell which is mounted so as to be displaceable relative to the seat frame in the longitudinal direction of the seat in order to adjust the seat depth. The seat depth can be adjusted by means of a motor which is mounted on the seat shell.

The motorized adjustment of the seat depth increases the level of comfort for the occupant. The mounting of the motor on the seat shell has the advantage that a seat cushion comprising the seat shell may be produced as a pre-mounted subassembly. In this case, the mounting on the upper side of the seat shell has the advantage that, relative to manual seat depth adjustment, no additional constructional space is required in the region of the seat frame. The displacement of the seat shell and thus of the seat cushion as a whole has the advantage that the thickness of the padded portion of the seat cushion is maintained.

An arrangement of the motor in the front region of the seat shell provides the advantage that an increase in the thickness of the padded portion is possible for maintaining the seating comfort and that, for shorter seat depths, the seat cushion may be pushed under the backrest. In order to protect the motor from the weight of the occupant and the padded portion from the motor, preferably at least one cover is provided for the motor. This cover may be configured as an anti-submarining ramp, being configured to rise at least partially from back to front in the longitudinal direction of the seat.

The conversion of the rotational movement of the motor into a defined displacement of the seat cushion preferably takes place by means of a pinion and a toothed rod meshing therewith. The toothed portion of the toothed rod is preferably formed on the edge of a first opening on one of the two sides extending in the longitudinal direction of the seat, whereby the rotating pinion is covered at the side. In order not to be dependent on the accuracy of the guides between the seat shell and the seat frame, preferably a further guide is provided between the seat shell and the toothed rod, for example a second opening in the toothed rod and a guide pin received thereby and movable relative thereto. The arrangement is also interchangeable. Preferably, the pinion and the toothed segment are arranged on the lower side of the seat shell with respect to the principal oscillating direction, in order to avoid being interfered with by the padded portion and an elongate slot in the seat shell for access to the seat frame. Accordingly, the output shaft of the motor protrudes through the seat shell.

A central arrangement of the pinion and toothed rod in the transverse direction of the seat has the advantage that the guides between the seat shell and seat frame are prevented from jamming. Additionally, it is possible to use the constructional space which in the known manual seat depth adjustment is kept free for the handle and the locking bar. The fastening of the toothed segment to the seat frame at the front end of the toothed segment is also appropriate for this purpose. In the manner of a modular system, the seat frame may optionally be combined with a seat shell with manual or electrical seat depth adjustment, so that during production it is not necessary to provide variants of the seat frame. The seat shell in both variants is the same and also the seat cushion may subsequently be easily replaced.

The invention is described in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
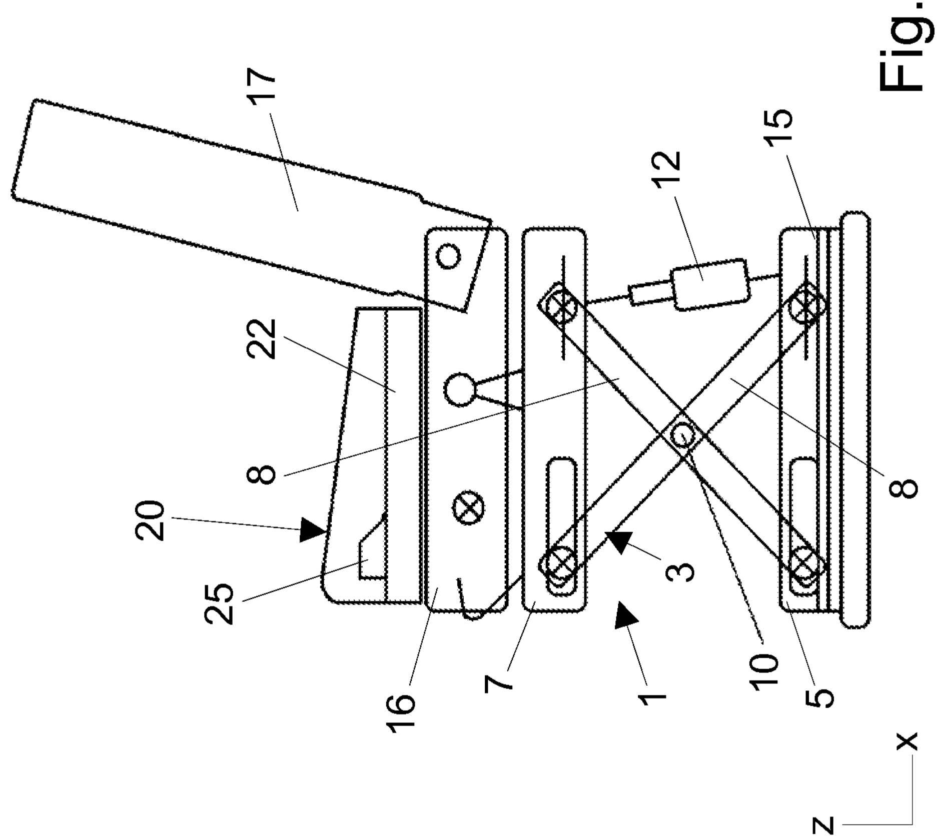
FIG. 1 is a schematic side view of the exemplary embodiment according to the invention.
Figure 2:
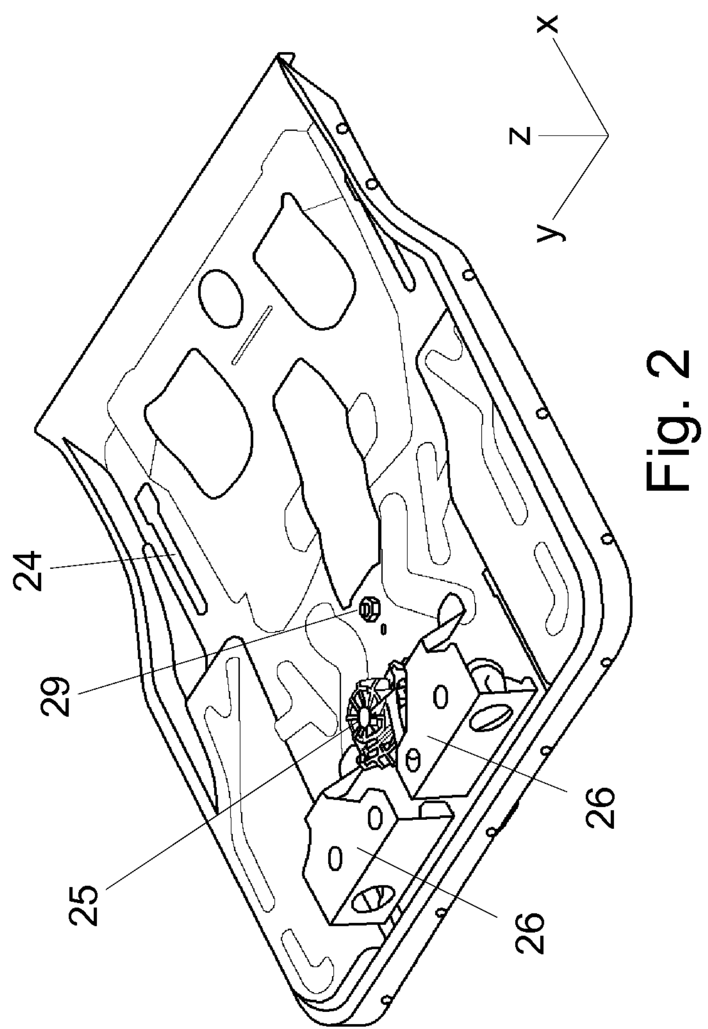
FIG. 2 is a perspective view of the seat shell shown obliquely from above.
Figure 3:
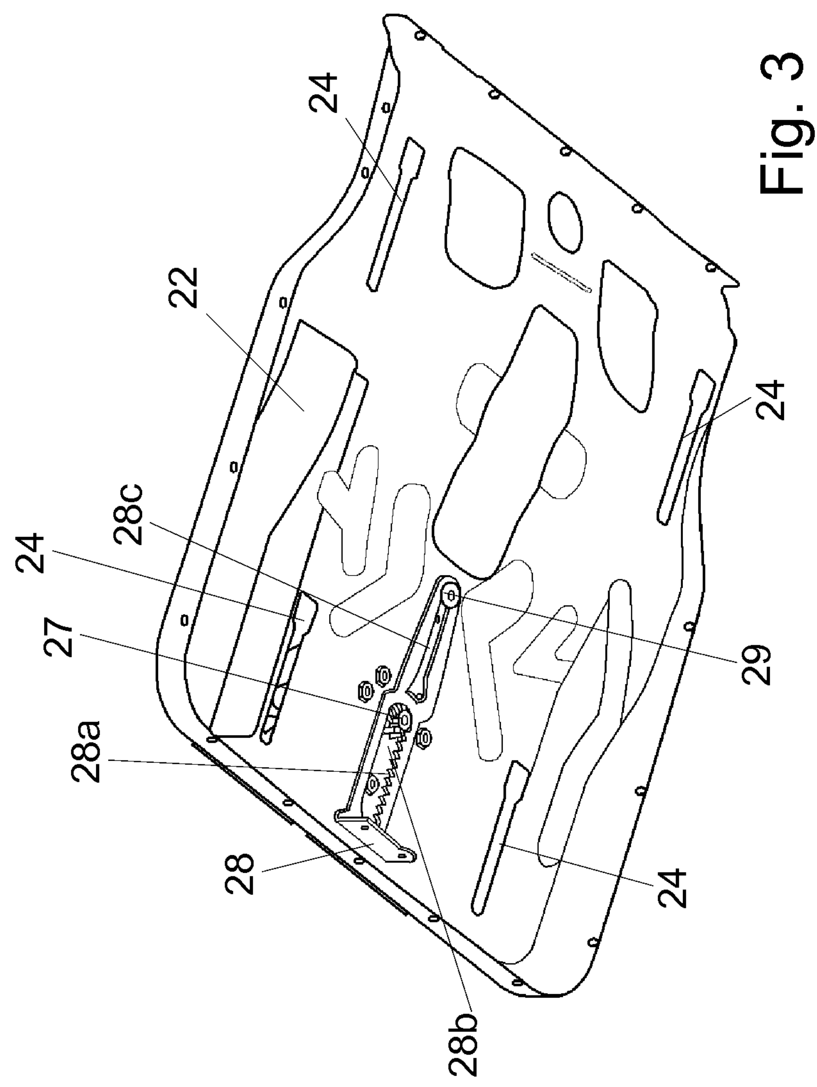
FIG. 3 is a perspective view of the seat shell obliquely from below.

Referring to the drawings in particular, a vehicle seat 1 for a utility vehicle or a different motor vehicle has a scissor-type stand 3, which comprises a lower frame 5, an upper frame 7 arranged above said lower frame and on both sides one respective pair of rockers 8 which cross over one another. A scissor axis 10 connects the two points of intersection and at the same time defines the axis extending in the transverse direction of the seat y, about which the rockers 8 can pivot relative to one another. The rockers 8 are in each case at their rear end rotatably mounted on the lower frame 5 and/or on the upper frame 7—in a manner to be described below in more detail—and in each case have at their front end rotatable rollers by means of which they are movably guided in or on the upper frame 7 and/or lower frame 5 in the longitudinal direction of the seat x. By this movement of the rockers 8, the height of the upper frame 7 over the lower frame 5 is altered, denoted in short hereinafter as the height of the scissor-type stand 3. By means of a spring 12 and preferably a damper, the scissor-type stand 3 is an oscillating system which increases the seating comfort. The principal direction of oscillation of the scissor-type stand 3, which in the ideal case corresponds to the vertical, is denoted by z.

The scissor-type stand 3 in the present case is displaceable by means of seat rails 15 in the longitudinal direction of the seat x, whereby the vehicle seat 1 is longitudinally adjustable, i.e. its longitudinal seat position is adjustable. The vehicle seat 1 further comprises a seat frame 16 which, on the one hand, in its rear region is articulated on both sides to the upper frame 7 and, on the other hand, in its front region is able to be raised and lowered by means of an inclination adjuster and thus is adjustable in its inclination relative to the scissor-type stand 3. The vehicle seat 1 also has a backrest 17 which is attached to the seat frame 16 (or alternatively to the upper frame 7)—in the present case in a manner in which the inclination is adjustable.

A seat cushion 20 is arranged on the seat frame 16, said seat cushion comprising as a subassembly a seat shell 22, for example made of sheet metal or plastics material, a padded portion, for example made of foamed material, resting on the seat shell 22 and a cover, for example made of leather or textiles, enclosing the padded portion and fastened to the seat shell 22. The seat depth of the seat cushion 20 is adjustable, which is why the seat shell 22 is movably mounted in the longitudinal direction of the seat x relative to the seat frame 16, in the present case by means of four lateral guides 24 (two to the left, two to the right), for example slide bearings made of plastics material or ball bearings such as in the drawers of items of furniture. The guides 24, of which in the drawings only the associated receivers are shown in the seat shell 22, define a four-point bearing (between the seat shell 22 and the seat frame 16).

On the upper side of the seat shell 22 with respect to the principal oscillating direction z, the seat cushion 20 also has a geared motor—as a drive for the seat depth adjustment—i.e. a subassembly consisting of an electric motor and gear stage on the output side, denoted in short hereinafter as the motor 25, and namely in the present case approximately centrally in the transverse direction of the seat y and in the front region in the longitudinal direction of the seat x. The housing of the motor 25 is fastened to the seat shell 22, in the present case screwed-on by means of screws and welding nuts welded onto the seat shell 22. At least one, in the present case two, covers 26, which are preferably configured as simple edge parts and are fastened—for example by means of spot welding—to the seat shell 22, at least partially cover the motor 25 in order to protect both the motor 25 from the weight of the occupant and the padded portion from damage by the motor 25. The padded portion preferably has a recess for the covers 26 and the motor 25 in order to avoid compression of the padded portion and thus a reduced effect. The covers 26 have an oblique path, being configured to rise at least partially in the principal oscillating direction z—in the longitudinal direction of the seat x from back to front—in order to counteract the submarining effect, i.e. the lower body of the occupant slipping-through under the lap belt.

The output shaft of the motor 25 protrudes through a central opening on the seat shell 22 in the transverse direction of the seat y, onto the lower side of the seat shell 22 in the principal oscillating direction z. On the output shaft is located fixedly in terms of rotation a pinion 27 which meshes with a toothed segment 28, more specifically with a toothed portion 28*a* thereof. The toothed segment 28 is of elongate shape and is fastened at its front end to the seat frame 16, in the present case screwed-on, for which purpose the seat frame comprises two openings. The toothed segment 28 has two slots one behind the other in the longitudinal direction of the seat x. The pinion 27 is arranged in the front first opening 28*b*. The toothed portion 28*a* is configured on the edge of this first opening 28*b*, on one of the two sides extending in the longitudinal direction of the seat x. Through the rear second opening 28*c*, a guide pin 29 is inserted, which is fastened in the transverse direction of the seat y centrally onto the seat shell 22, in the present case screwed-on, and protrudes downwards in the principal oscillating direction z. The guide pin 29 may comprise at its lower free end a head so that the toothed segment 28 is secured in the principal oscillating direction z. The guide pin 29 may consist of plastics material for the purpose of damping noise.

In order to adjust the seat depth of the seat cushion 22, the motor 25 is supplied with current, whereby the pinion 27 rotates and runs along the toothed portion 28*a*. As a result, the seat cushion 22 is displaced with the seat shell 22 in the longitudinal direction of the seat x. For shorter seat depths, the seat cushion 22 is pushed into a constructional space which is present below the lower end of the backrest 17. The attachment of the backrest 17 to the seat frame 16 (or to the upper frame 7) is accordingly designed for this purpose. In an alternative embodiment, the seat frame 16 and the upper frame 7 are the same component.

While specific embodiments of the invention have been described in detail to illustrate the application of the principles of the invention, it will be understood that the invention may be embodied otherwise without departing from such principles.

The invention claimed is:

1. A vehicle seat comprising:

a seat frame;

a seat shell which is mounted so as to be displaceable relative to the seat frame in a longitudinal direction of the seat to adjust a seat depth;

a motor mounted on the seat shell, the seat depth being adjusted by means of the motor, said motor being mounted on an upper side of the seat shell with respect to a direction of a seat height;

a cover; and a seat cushion having as a pre-mounted subassembly the seat shell, a padded portion of the seat cushion resting on the seat shell and the cover enclosing the padded portion and being fastened to the seat shell.

2. The vehicle seat as claimed in claim 1, wherein the motor is covered at least partially with the cover which is fastened to the seat shell.

3. The vehicle seat as claimed in claim 2, wherein the cover is configured to have at least partially a rising shape in the direction of the seat height from a back to a front in the longitudinal direction of the seat.

4. The vehicle seat as claimed in claim 1, further comprising:

a pinion; and a toothed segment fastened to the seat frame, wherein the motor cooperates by means of the pinion with the toothed segment, a toothed portion of the toothed segment meshing with the pinion.

5. The vehicle seat as claimed in claim 4, wherein the toothed segment has a first opening extending in the longitudinal direction of the seat, the toothed portion being configured on the edge thereof on one side.

6. The vehicle seat as claimed in claim 5, wherein the toothed segment has a second opening extending in the longitudinal direction of the seat, which receives a guide pin provided on the seat shell.

7. The vehicle seat as claimed in claim 4, wherein the pinion and the toothed segment are arranged on a lower side of the seat shell in a direction of a seat height.

8. The vehicle seat as claimed in claim 4, wherein the toothed segment is fastened at a front end thereof to the seat frame in the longitudinal direction of the seat.

9. The vehicle seat as claimed in claim 4, wherein the pinion and/or the toothed segment are arranged centrally relative to the seat shell in a transverse direction of the seat.

10. The vehicle seat as claimed in claim 1, further comprising a scissor-type stand which is capable of oscillating in a direction of a seat height, wherein the scissor-type stand carries the seat frame.

11. The vehicle seat as claimed in claim 1, wherein the motor is arranged with said cover inside a recess of the padded portion.

12. A utility vehicle seat comprising:

a seat frame;

a seat shell mounted so as to be displaceable in a seat longitudinal direction relative to the seat frame to adjust a seat depth;

a motor mounted on the seat shell and moving the seat shell relative to the seat frame for adjusting the seat depth;

a cover;

a seat cushion having as a pre-mounted subassembly the seat shell, a padded portion of the seat cushion resting on the seat shell and the cover enclosing the padded portion and being fastened to the seat shell; and a scissor-type stand carrying the seat frame, the scissor-type stand oscillating in a direction of a seat height, wherein the motor is mounted on an upper side of the seat shell with respect to the direction of the seat height.

13. The vehicle seat as claimed in claim 12, wherein the motor is covered at least partially with the cover which is fastened to the seat shell and the cover is configured to rise at least partially in the direction of the seat height.

14. The vehicle seat as claimed in claim 12, further comprising:

a pinion; and a toothed segment fastened to the seat frame, wherein the motor is connected to the pinion which engages a toothed portion of the toothed segment.

15. The vehicle seat as claimed in claim 14, further comprising a guide pin provided on the seat shell, wherein:

the toothed segment has a first opening extending in the longitudinal direction of the seat;

the toothed portion is configured on an edge defining the first opening;

the toothed segment has a second opening extending in the longitudinal direction of the seat; and the second opening receives the guide pin.

16. The vehicle seat as claimed in claim 12, wherein the motor is arranged with said cover inside a recess of the padded portion.

* * * * *